United States Patent [19]

Seki

[11] Patent Number: 5,608,956
[45] Date of Patent: Mar. 11, 1997

[54] SYSTEM FOR AUTOMATICALLY ASSEMBLING A SEAT

[75] Inventor: Kenichi Seki, Akishima, Japan

[73] Assignee: Tachi-S Co., Ltd., Tokyo, Japan

[21] Appl. No.: 609,526

[22] Filed: Mar. 1, 1996

[51] Int. Cl.⁶ ............................... B68G 7/00; B23P 11/00
[52] U.S. Cl. ................................... 29/91; 29/434; 29/701
[58] Field of Search ............................ 29/91, 91.5, 91.7, 29/91.8, 91.1, 434, 407.09, 407.1, 525.11, 701, 281.1, 281.4, 281.5

[56] References Cited

FOREIGN PATENT DOCUMENTS

| 62-74396 | 4/1987 | Japan . | |
|---|---|---|---|
| 200492 | 7/1992 | Japan | 29/91.1 |
| 250190 | 9/1992 | Japan | 29/91.1 |
| 07-16362 | 1/1995 | Japan . | |
| 07-148364 | 6/1995 | Japan . | |

Primary Examiner—David P. Bryant
Attorney, Agent, or Firm—Browdy and Neimark

[57] ABSTRACT

A system for automatically connecting a seat back to a seat cushion to assemble a seat, which includes a first setting device for setting the seat back upright, a second setting device for setting a seat cushion horizontally, and a robot hand device. The seat back is easily set on the first setting device, with a part of its upholstery being turned up by a retaining element of the same first setting device to expose the associated connecting member. The robot hand device includes a pressure arm element to pressingly hold such turned-up part of seat back upholstery. The seat back is transferred by the robot hand device to the second setting device, maintaining such turned-up state of the upholstery part all the way, so that the exposed connecting member of seat back is connected to another connecting member of seat cushion by operation of an automated connecting device of said second setting device, thereby forming a resulting seat.

16 Claims, 7 Drawing Sheets

SYSTEM FOR AUTOMATICALLY ASSEMBLING A SEAT

BACKGROUND OF INVENTION

1. Field of Invention

The present invention relates to a system for automatically assembling an automotive seat, and in particular, to a system for automatically connecting a seat back of the seat to a seat cushion of same to thereby produce a complete automotive seat.

2. Description of Prior Art

In the assemblage of an automotive seat, a seat back and a seat cushion are provided independently of each other before they are connected together to form a complete seat.

Conventionally, a worker takes and carries the seat back to the seat cushion, and connects them together by bolting, while holding the seat back upright so as to produce a complete seat for use in an automotive seat. In most cases, the worker has to effect the bolting by one hand while holding the seat back upright by another hand, which hinders smooth assembling works and imposes much labor on the worker.

Meanwhile, there is such a type of automotive seat to formed by a seat back having a connecting bracket covered with a part of trim cover assembly and a seat cushion having an upwardly projecting connecting arm of reclining device. In this particular case, the foregoing manual way of seat assemblage has been thought indispensable because it has been difficult to use a machine to automatically strip off the part of trim cover assembly to expose the connecting bracket of seat back and fix that exposed bracket by bolts to the reclining device arm of seat cushion, without impairing an aesthetic appearance of a resulting seat.

SUMMARY OF THE INVENTION

In view of the above-stated drawbacks, it is therefore a primary purpose of the present invention to provide a system for automatically connecting a seat back to a seat cushion to assemble a seat, while retaining a part of upholstery of the seat back turned up to expose its connecting member for connection to a connecting member of the seat cushion, without much labor and expertise on the worker's part.

In order to attain such purpose, the system in accordance with the present invention is basically comprised of:

a first setting means for setting the seat back at a predetermined position in a generally upright state;

the first setting means including a retaining means for receiving and retaining such part of upholstery of seat back which is peeled or turned up from the same seat back, so as to keep the seat back's connecting member exposed therefrom;

a second setting means for setting the seat cushion at a predetermined position in a generally horizontal state;

the second setting means including an automated connecting means for automatically connecting the foregoing connecting member exposed from the seat back, to other connecting member of the seat cushion;

a robot hand means for automatically grasping and transferring the seat back set by the first setting means towards the second setting means; and the robot hand means including a pressure arm means for pressingly holding the abovementioned part of upholstery of seat back which is turned up on the retaining means of first setting means, to thereby continue to keep the seat back connecting member exposed from the seat back.

Accordingly, it is easy to set the seat back upright with its upholstery part turned up, and set the seat cushion horizontally, after which the seat back is brought by the robot hand means, while keeping the upholstery part turned up, for connection of the exposed connecting member of seat back to another connecting member of seat cushion. This connection is also effected automatically by the automated connecting means, to produce a resulting seat. During the automated operations, the foregoing part of seat back upholstery is kept turned up all the way, and at the completion of the operations, the pressure arm means of robot hand means releases the turned-up part of seat back upholstery from the pressed and folded state, allowing a worker to stretch that upholstery part over the seat back connecting member onto the home securing area of seat back.

Preferably, the first setting means may comprise a pair of upwardly projected first support elements for supporting a central body portion of the seat back therebetween and a pair of upwardly projected second support elements, each being for supporting respective two lateral side portions of the seat back.

As one aspect of the invention, in the case where the seat cushion is provided, at the reverse side thereof, with plural different leg pieces having different sizes and shapes, creating uneven points there, the second setting means may include plural different securing elements, each being arranged to receive and secure a corresponding one of those plural different leg pieces to counterbalance such uneven points such as to set the seat cushion on a generally horizontal plane.

Preferably, a turn table may be proved in the second setting means to permit a resulting seat formed by the present system to be oriented towards another place.

The pressure arm means of the robot hand means may comprise a rotary cylinder and a rotary arm connected to said rotary cylinder, so that operating the rotary cylinder will cause the rotary arm to rotate in a direction to pressingly hold the foregoing part of upholstery which is turned up on the retaining means. The rotary arm may be of a generally L-shaped configuration having a pressure section to press and hold such turned up part of seat back upholstery.

Preferably, the automated connecting means may comprise an automated bolting device operable to automatically connect the seat back connecting member via a bolt to the seat cushion connecting member.

All other features and advantages of the present invention will become apparent from reading of the descriptions hereinafter, with reference to the annexed drawings.

DETAILED DESCRIPTION OF PREFERRED EMBODIMENT OF THE INVENTION

Figure 1:
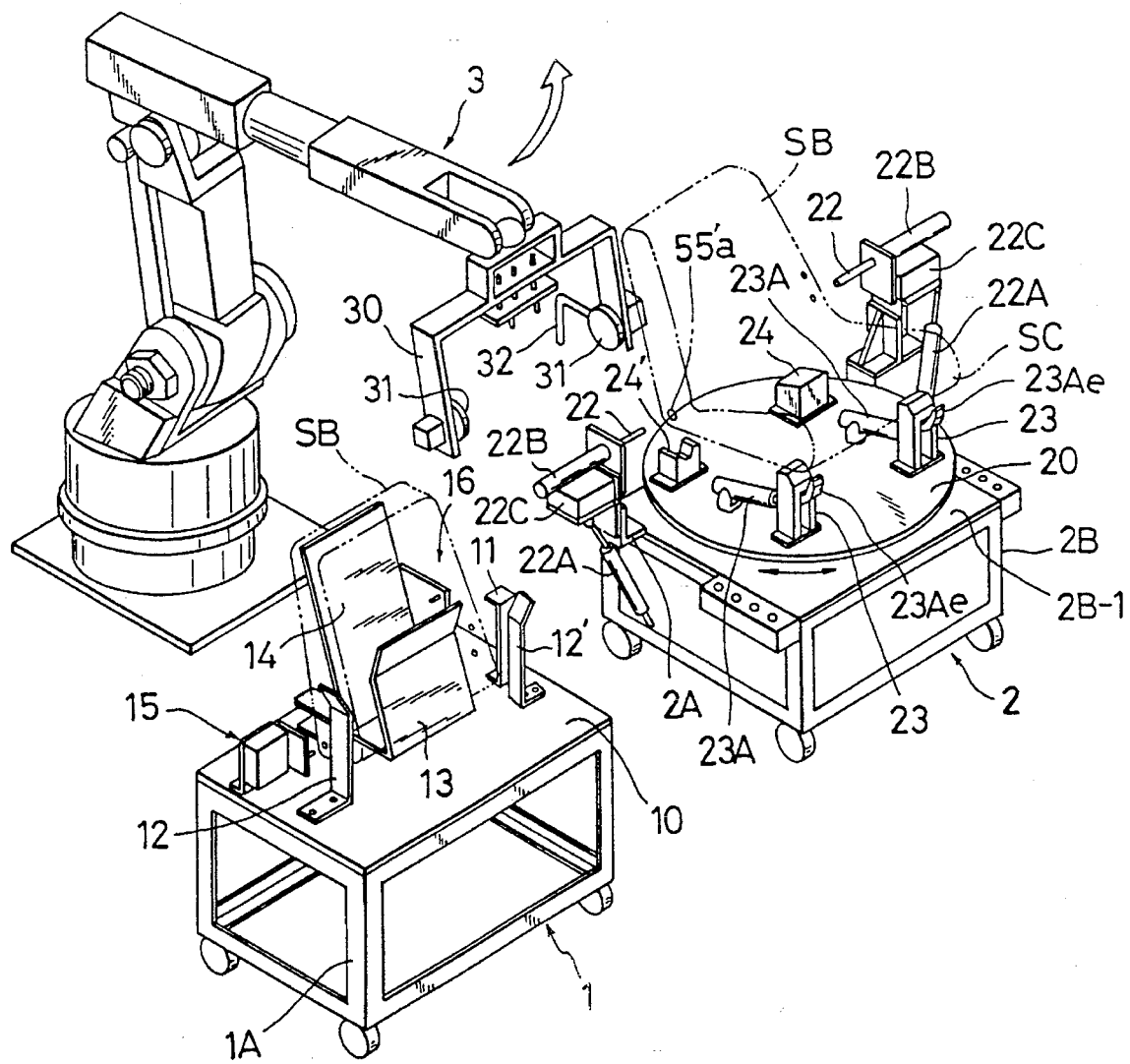
FIG. 1 is a schematic perspective view of a seat assembling system in accordance with the present invention.

In FIG. 1, there is illustrated a whole automated system for assembling a seat, in accordance with the present invention, which basically comprises: a setting device (1) for setting a seat back (SB) generally upright at a predetermined point; a setting/bolting device (2) for setting a seat cushion (SC) generally horizontal at a predetermined point and bolting the seat back (SB) to the seat cushion (SC); and a robot hand device (3) for transferring the seat back (SB) from the setting device (1) towards the setting/bolting device (2).

Figure 5:
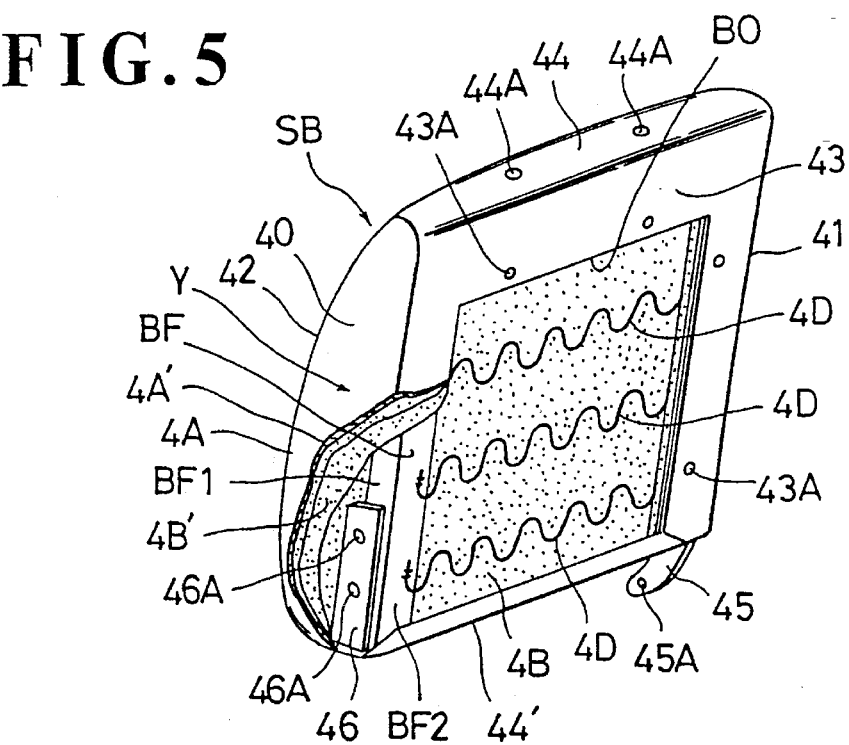
FIG. 5 is a perspective view of a seat back used in the system, showing the back side thereof.
Figure 6:
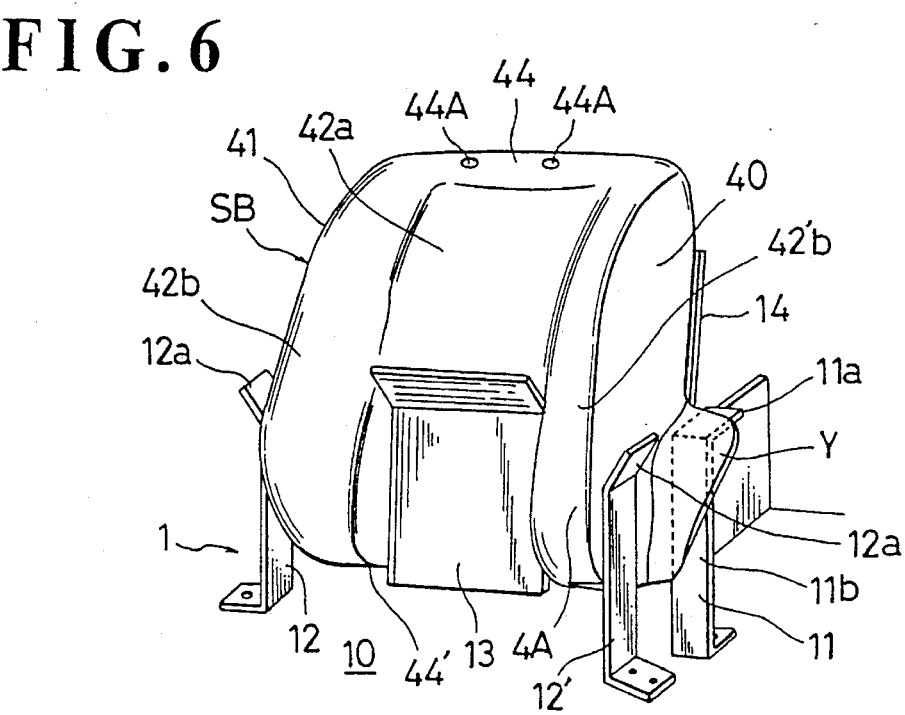
FIG. 6 is a fragmentary perspective view showing the state where the seat back is set on the setting device.
Figure 10:
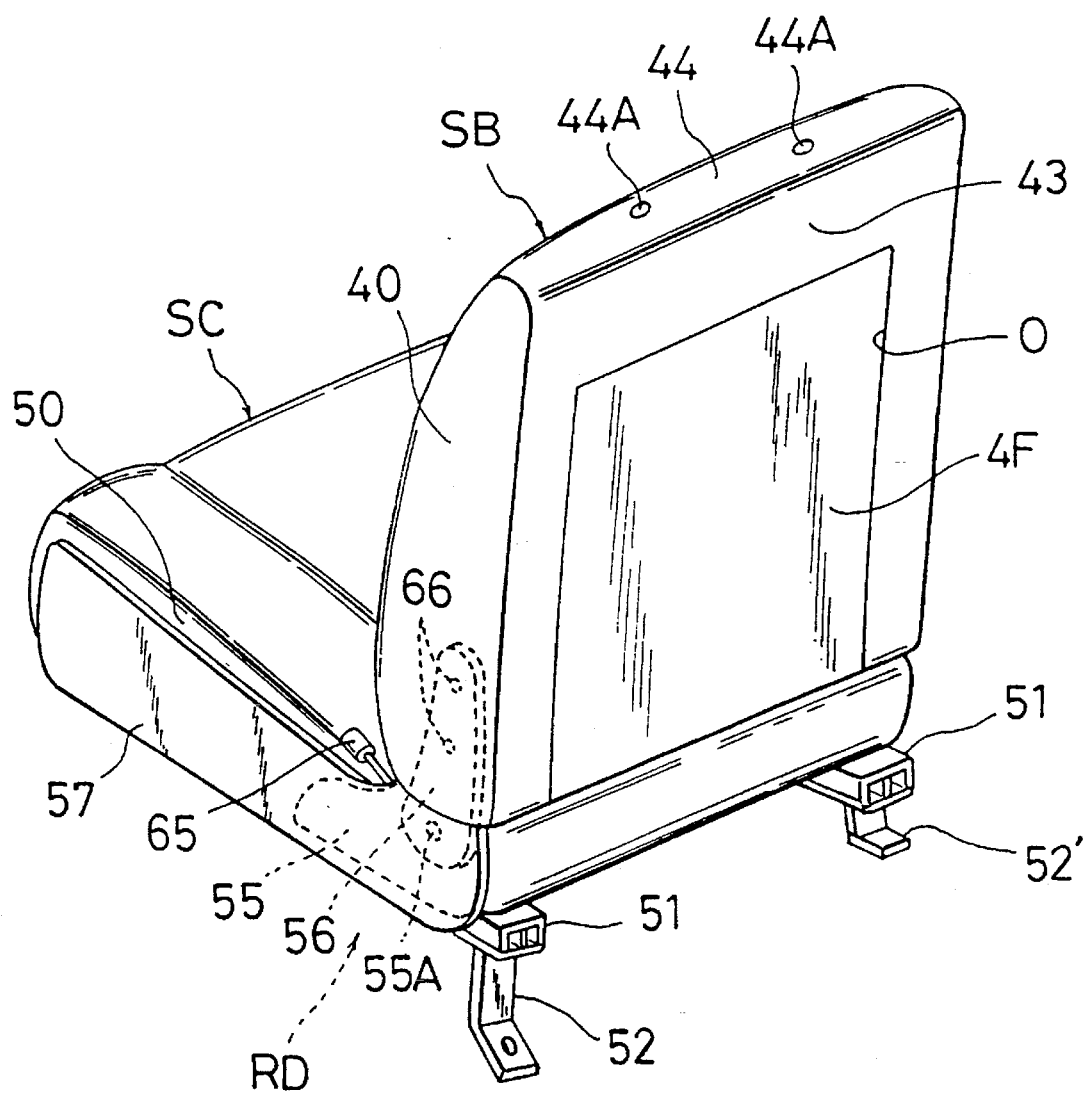
FIG. 10 is a perspective view of a resulting automotive seat assembled from the seat back and seat cushion by means of the system in accordance with the present invention.

Reference is firstly made to FIGS. 5, 6 and 10 which show the seat back (SB) and seat cushion (SC) to be assembled together into an automotive seat (see FIG. 10) in accordance with the present invention. In the illustrated embodiments, the seat back (SB) comprises a foam cushion member (4B), a seat back frame (BF), a trim cover assembly (4A) covering the cushion member (4B) and seat back frame (BF), a connecting bracket (46) fixed on the right-side area of one lateral section (BF1) of seat back frame (BF), and a downwardly projecting connecting bracket (45) fixed on another lateral section (not shown) of seat back frame (BF). As understandable from FIG. 5, both trim cover assembly (4A) and cushion member (4B) are folded over the seat back frame (BF) onto the back side areas (BF2) of same frame, such that the rectangular boundary edges (BO) are defined at the back side (43) of seat back (SB). A back board (4F) is to be secured within that rectangular boundary edges (4F) into plural securing holes (43A) formed around the boundary edges (BO). Designations (4D) denote plural sinuous springs provided in the seat back frame (BF).

In FIG. 5, designation (Y) represents a part of upholstery lamination layers (4A')(4B') respectively of the trim cover assembly (4A) and cushion member (4B), which normally covers both right-side lateral wall (40) of seat back (SB) and connecting bracket (46) and can be peeled or turned up from the back side (FB2) of seat back (BF) and that seat back lateral wall (40) in order to expose the connecting bracket (46) for connection to an upwardly projecting arm (56) of reclining device (RD) fixed on the right-side lateral side (50) of seat cushion (SC). Hereinafter, this particular part shall be referred to as "turn-up part" with the designation of (Y).

As shown, the setting device (1) and the setting/bolting device (2) are located abreast of and apart from each other, with the latter (2) being disposed on the side accessible to a transfer path (not shown) running adjacently behind the present system. The robot hand device (3) is disposed behind and between those two devices (1)(2).

Figure 2:
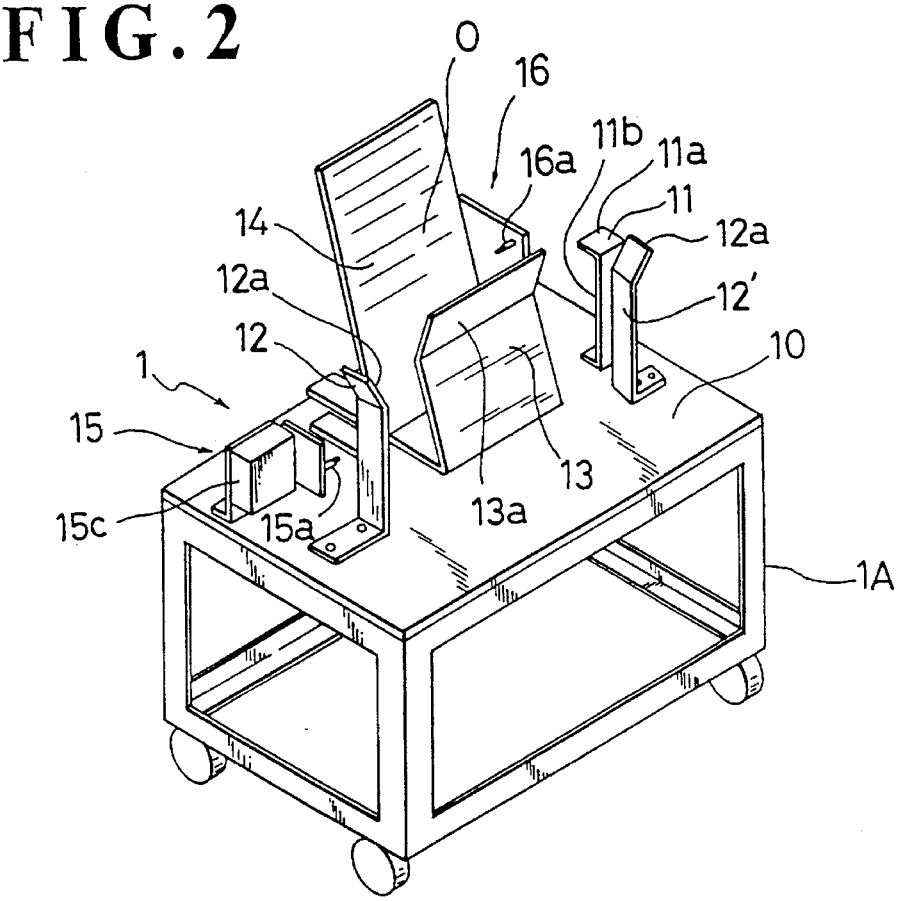
FIG. 2 is a schematic perspective view of a setting device provided in the system.
Figure 3:
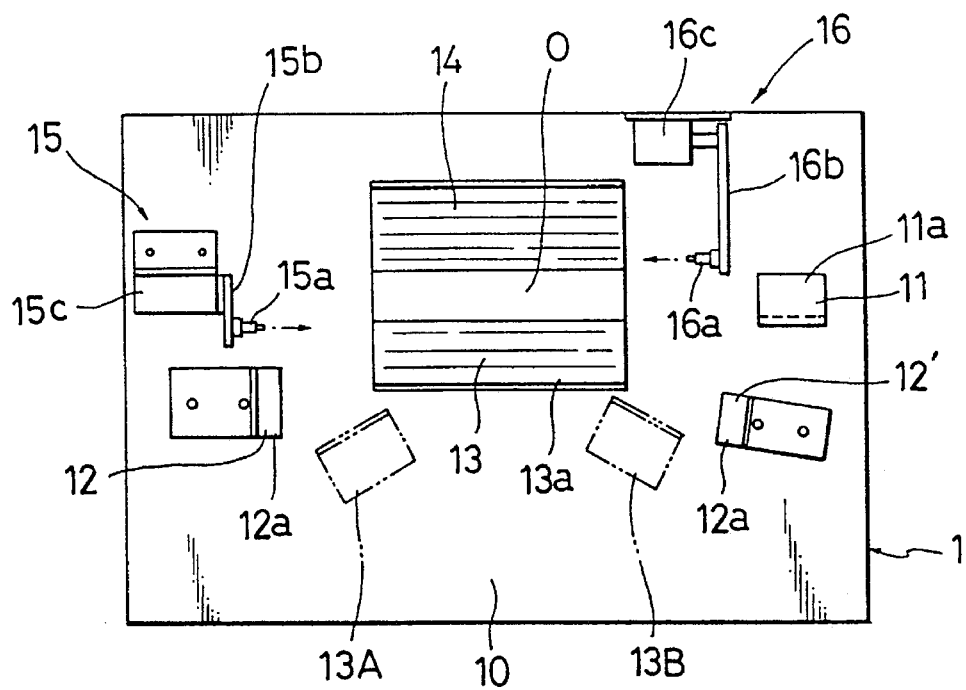
FIG. 3 is a schematic plan view of the setting device.

Referring now to FIGS. 2 and 3, the setting device (1) is depicted to have, arranged basically thereon, a forward seat back support plate (13), a backward seat back support plate (14), a pair of first and second seat back lateral support plates (12)(12') and a turn-up-part retaining plate (11) of an inverted-L-shaped configuration for receiving and retaining the foregoing "turn-up part" (Y) of seat back (SB). All those plates erect fast upon a base plate (10).

Specifically, the base plate (10) is fixed on a base frame (1A), and both forward and backward support plates (13)(14) are disposed generally at the center of the base plate (10), with an opening (0) defined therebetween. A seat back (SB) is to be inserted in that opening (0), thereby allowing the seat back (SB) to be set and located at a predetermined position in an upright state, such that the forward support plate (13) supports the frontal recessed surface area (42a) of seat back (SB), while the backward support plate (14) supports the back side (43) of same seat back (SB), as shown in FIG. 6. In the present embodiment, the backward support plate (14) is formed in a flat manner and the forward support plate (13) is inclined towards the vertical surface of the backward support plate (14), having a forwardly inclined end part (13a), such as to slightly compress the seat back (SB) therebetween.

The first and second lateral support plates (12)(12') are disposed fast on the base plate (10) in a generally symmetrical manner relative to the forward and backward support plates (13)(14), erecting therefrom such as to set and support the respective two lateral swollen bolster portions (42b)(42'b) of seat back (SB), as shown in FIG. 6. The first and second lateral support plates (12)(12') are each formed with inclined upper end parts (12a)(12'a), respectively, to permit the respective two bolster portions (42b)(42'b) of seat back (SB) to be guided easily therealong.

The turn-up-part retaining plate (11) is formed by a vertical portion (11b) fixed on the base plate (10) and a horizontal portion (11a) extending at a right angle from the vertical portion (11b) in a direction backwardly of the base plate (10) towards the side where the backward plate (14) lies. This retaining plate (11) is disposed laterally of the first and second support plates (13)(14) and spaced therefrom a distance generally equal to a thickness of one of the paired bolster portions (42b)(42'b) of seat back (SB). With this arrangement, the retaining plate (11) may be used to retain the turn-up part (Y) when the seat back (SB) is set on the setting device (1) with the corresponding part thereof peeled from the lateral side (40) of seat back (SB), as will be understood later.

Optionally, in order to make precise and positive the foregoing setting of seat back (SB), there may be arranged a pair of securing devices (15)(16) which are operable to insert their respective securing pins (15a)(16a) into the connecting hole (45A) of downwardly projecting arm (45) and the connecting hole (46A) of bracket (46), respectively, thereby firmly retaining the seat back (SB) set in the forward and backward support plates (13)(14) against dislocation from a predetermined position. Designations (15C)(16C) denote the respective motors of the two securing devices (15)(16) for causing movement of their respective securing pins (15a)(16a) towards and away from the corresponding respective lateral sides (41)(40) of seat back (SB).

Further, a pair of support plates (13A)(13B) may be arranged in the setting device (1), as indicated by the two-dot chain lines in FIG. 3, in order to enhance the precise positioning of the seat back (SB) in addition to the two securing devices (15)(16).

Figure 4:
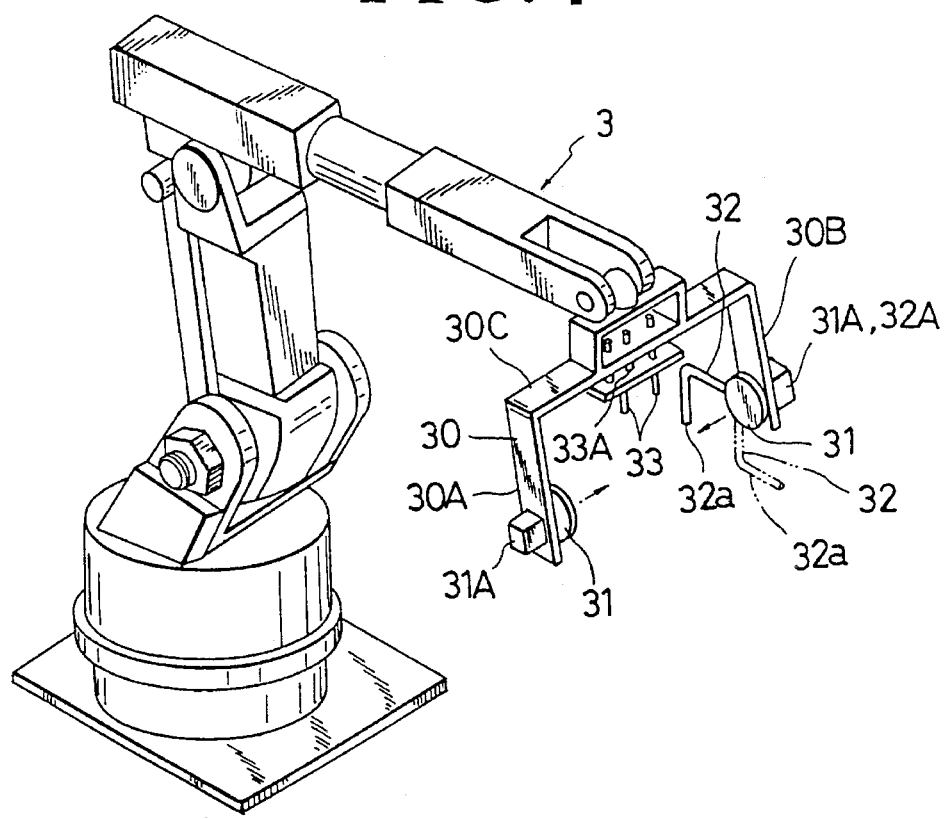
FIG. 4 is a schematic perspective of a robot hand device provided in the system.

FIG. 4 shows the robot hand device (3) to have a generally inverted-U-shaped arm (30) formed by two spaced-apart vertical arm portions (30A)(30B) and a horizontal arm portion (30C). The width between the two arm portions (30A)(30B) is greater than the width of seat back (SB) for the purpose of grasping the seat back (SB) from both lateral sides and releasing same therefrom. The two arm portions (30A)(30B) are provided with two disc-like grasping hand portions (31)(31) and two associated cylinders (31A)(31A). As viewed from FIG. 4, at the right-side arm portion (30B), an L-shaped rotary arm (32) is provided adjacent to the grasping hand portion (31) and has a rotation shaft (32b) connected to a rotary cylinder (32A) (See FIG. 9). Both cylinder (31A) and rotary cylinder (32A) are accommodated in one housing as shown. Thus, operating the two cylinders (31A)(31A) will cause the two hand portions (31)(31) to be moved towards and away from each other to grasp the seat back (SB). On the other hand, by operation of the rotary cylinder (32A), the rotary arm (32) is rotated about the shaft (32b) by 90 degrees between a non-use position indicated by the solid line and a use position indicated by the two-dot line in FIG. 4. It is noted here that, as understandable from the solid line in FIG. 4, the rotary arm (32) is formed such that its body extends at a right angle from the shaft (32b) in parallel with a plane along which the right-side arm portion (30B) extends, and further bent downwardly at a right angle to form a pressure arm section (32a) adapted to fold and press the turn-up part (Y) of seat back (SB) against the lateral side (40) of the same seat back (SB) (See FIGS. 7 and 9).

Figure 7:
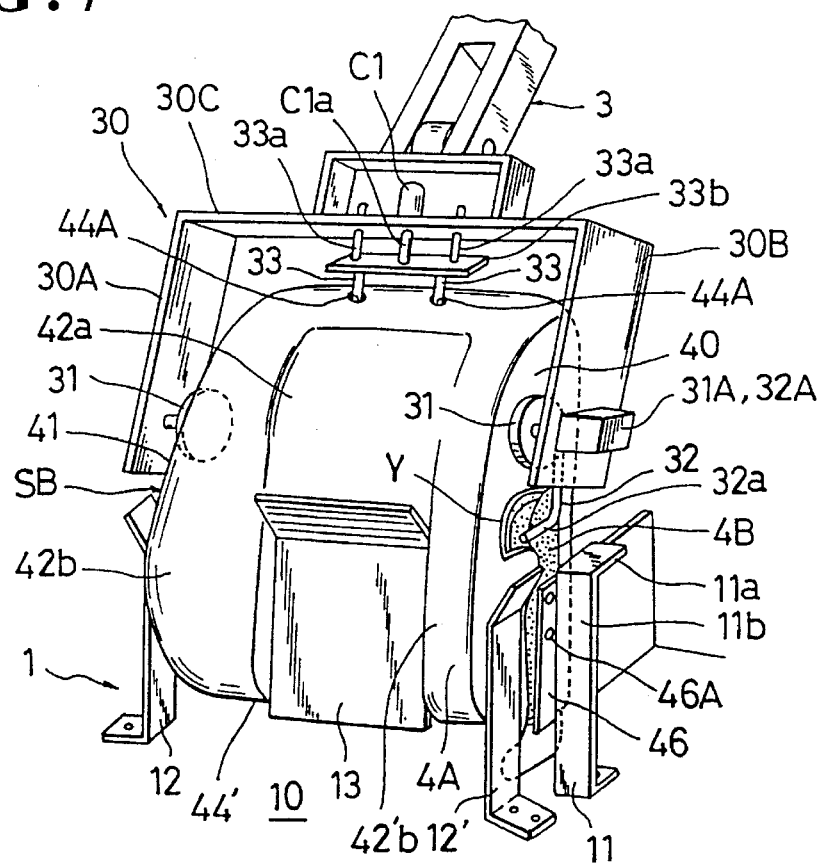
FIG. 7 is a fragmentary perspective view showing the state where the seat back set on the setting device is grasped by the robot hand device.
Figure 9:
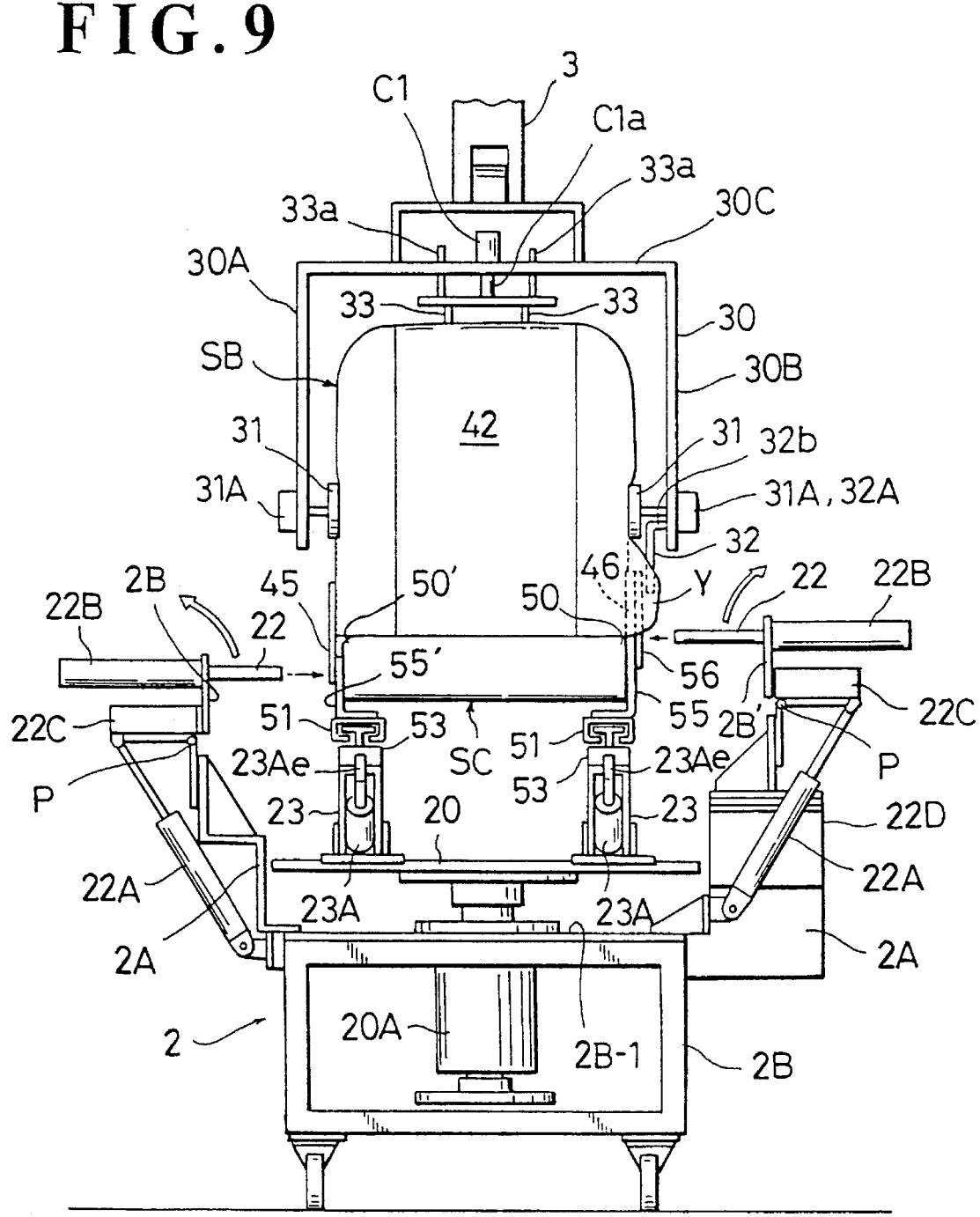
FIG. 9 is a partly broken schematic front view showing the state where the seat back is connected by the setting/bolting device to the seat cushion.

The robot hand device (3) is further provided with a pair of securing rods (33)(33) at the horizontal arm portion (30C) of its arm (30), as shown in FIGS. 7 and 9. The two securing rods (33)(33) are connected via a guide plate (33b) to the cylinder rod (C1a) of cylinder (C1) fixed on the upper surface of the horizontal arm portion (30C). Designations (33a)(33a) stand for two guide rods, respectively, each being fixed on the guide plate (33b) and passing slidably through the horizontal arm portion (30C). Hence, as can be seen in FIG. 7, the two securing rods (33)(33) may be lowered by operation of the cylinder (C1) and inserted into the two headrest stay holes (44A)(44A) formed in the top side (44) of seat back (SB), respectively, to thereby positively hold the seat back (SB) at a predetermined position set by the abovementioned seat back setting device (1).

Turning back to FIG. 1, there is shown the setting/bolting device (2) which basically comprises: a base frame (2B); a turn table (20); a seat cushion setting device (23, 24, 24'); and a pair of spaced-part automated connecting devices (22)(22) for automatically connecting the seat back (SB) via bolts to the seat cushion (SB).

Specifically, the turn table (20) is mounted via a rotary drive mechanism (20A) on a base plate (2B-1) fixed on the base frame (2B). Arranged upon that turn table (20) are a pair of same forward securing devices (23)(23) and a pair of different backward mount members (24)(24') in such a manner as to securely receive the four leg pieces (53)(53)(52)(52') of seat cushion (SC), respectively, so that the seat cushion (SC) is set in a horizontal state, as can be seen from FIGS. 1, 8, 9 and 10.

In this particular embodiment, the seat cushion (SC) used is provided, at the reverse side thereof, with a pair of slide rail devices (51), and provided with a connecting bracket (55') and a lower arm (55) of reclining device (see the designation (RD) in FIG. 10), at the respective two lateral sides of seat cushion frame (54) thereof. As can be seen from FIG. 9, the connecting bracket (55') is fixed on one lateral side (50') of seat cushion (SC) within the height-wise width of same seat cushion. By contrast, the reclining device lower arm (55) is connected via a pin (55A) (See FIG. 8) to an upper arm (56) of reclining device (RD) projecting upwardly above the upper surface of seat cushion (SC). Thus, as will be described, the seat cushion (SC) has non-projected and projected connecting portions (55')(56) which are each to be fit connected to the respective downwardly projected and connecting brackets (45)(56) of seat back (SB).

Figure 8:
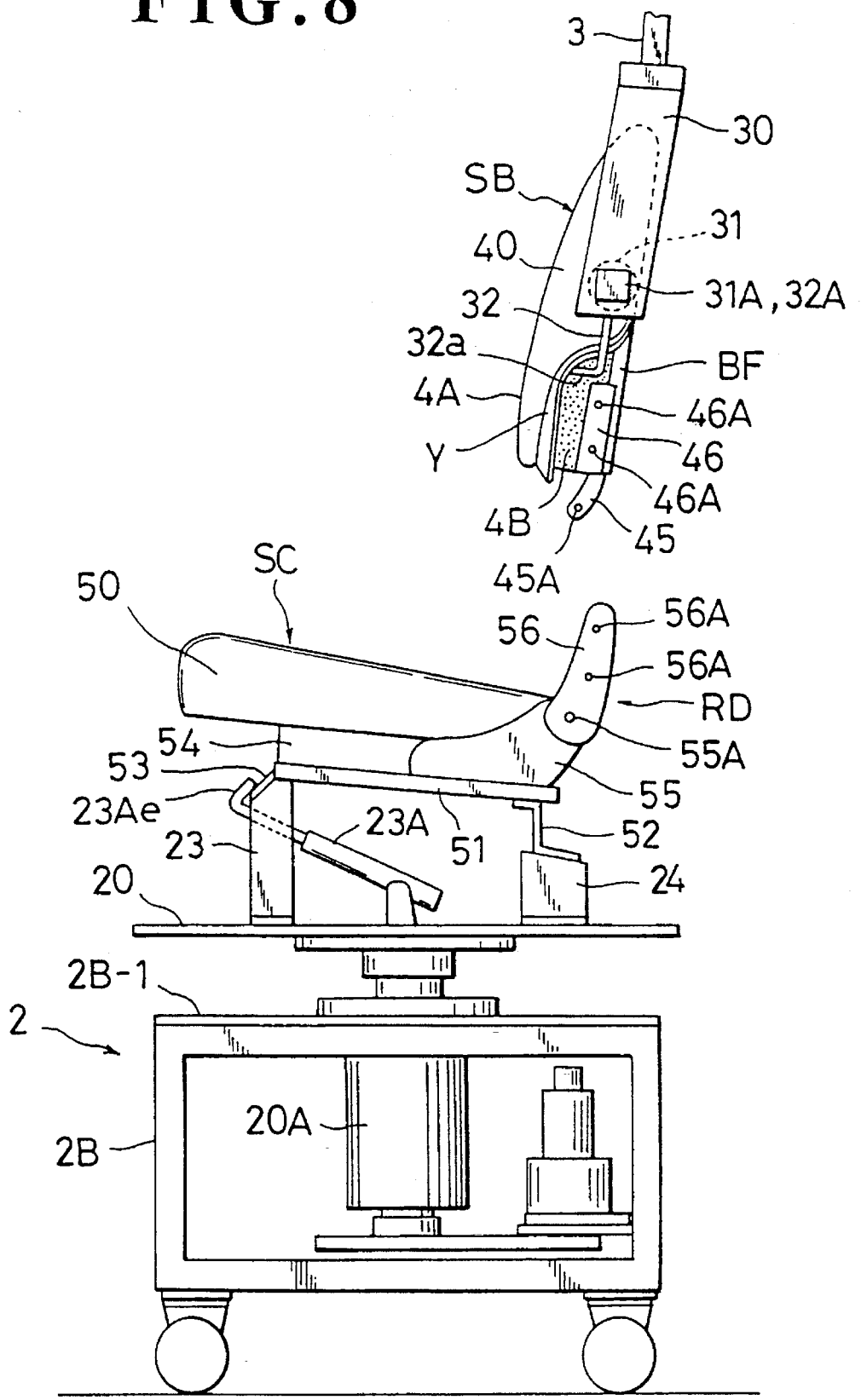
FIG. 8 is a partly broken schematic elevation view showing the state where the seat back is transferred by the robot hand device to a setting/bolting device on which a seat cushion is set.

The illustrated seat cushion (SC) has a pair of same short leg pieces (53)(53) fixed to the respective forward ends of two slide rail devices (51)(51), and a pair of different long leg pieces (52)(52') fixed to the respective backward ends of the same two slide rail devices (51)(51), which results in uneven securing points created at the reverse side of seat cushion (SC). In view of such uneven securing points, the four securing elements (23)(23)(24)(24') in accordance with the present invention are formed different in height for the corresponding leg pieces (53)(53)(52)(52'), to thereby counterbalance their respective lengths such as to set the seat cushion (SC) on a generally horizontal plane for precise connection to the seat back (SB), as seen in FIGS. 8 and 9. Namely, two forward securing devices (23)(23) erect from the turn table (20) up to a level higher than the two backward mount members (24)(24'). Each of the two forward securing devices (23)(23) includes a cylinder (23A) fixed on the turn table and a latch (23Ae) connected to the cylinder (23A). As shown in FIG. 8, operation of the cylinder (23A) draws its latch (23Ae) to lock the forward leg piece (53) of seat cushion (SC) against removal. This is however not limitative, and each securing element (23, 24, 24') may be modified in a proper configuration, depending on the shape and sizes of each corresponding leg piece (53, 52, 52'), to set the seat cushion (SC) on a generally horizontal plane.

The paired automated connecting devices (22)(22) are mounted on the respective two lateral sides of base frame (2B) in a mutually faced and symmetrical manner relative to the turn table (20). Each of the two automated connecting devices (22)(22) may be an automated bolt screwing device comprising a drive source (22C) (a motor); a first cylinder (22B) for moving the body of bolt screwing device (22) in a fore-and-aft direction transversely of the turn table (20); and a second cylinder (22A) for causing upward rotation of the bolt screwing device body (22) in the arrow direction from the horizontal use position as indicated in FIG. 9. More specifically, the construction of each bolt screwing device (22) is such that the drive source (22C) is rotatably connected via a pivot (P) to the upper end of a support frame (2A) and also connected to a cylinder rod of the second cylinder (22A) movably mounted on the base frame (2B), and both first cylinder (22B) and body of bolt screwing device (22) are supported by a bracket (2B) fixed to a housing of the drive source (22C), wherein, although not shown clearly, the drive source (22C) is operatively connected via the bracket (2B) to the bolt screwing device (22). The free end of the bolt screwing device (22) is designed to receive and screw a bolt. Operating the second cylinder (22A) will cause upward rotation of the bolt screwing device (22), orienting the free end of same device (22) in a proper upward direction to receive another bolt which is automatically supplied from a bolt feeder (not shown).

The turn table (20) is automatically rotated by 180 degrees so as to change the direction of a assembled seat towards a transfer path (not shown).

Although not shown, the robot hand device (3) and setting/bolting device (2) are electrically connected to a computer control unit (not shown) and may be automatically operated according to a predetermined program so as to carry out the operations to be explained below.

Now, a description will be made of operation of the above-described seat assembling system.

Firstly, a worker should peel a part of upholstery of seat back (SB) formed by the lamination of trim cover assembly (4A) and cushion member (4B) which corresponds to the above-defined "turn-up part" (Y), exposing the connecting bracket (46), and insert the seat cushion (SB) with such turn-up part (Y), from its lower side (44'), into the opening (0) between the forward and backward support plates (13)(14) on the setting device (1). As shown in FIG. 6, the seat back (SB) is set upright at a predetermined position by those two support plates (13)(14) and two lateral support plates (12)(12'), with the turn-up part (Y) received and retained on the right-angled corner portion of retainer plate (11) to maintain its peeled or turned-up state at the corresponding lateral side of seat cushion (SB). At this stage, preferably, the two securing devices (15)(16) should be operated to positively retain the seat back (SB) from both lateral sides thereof against dislocation from a predetermined position.

Also, on the other hand, the worker should set the seat cushion (SC) on the setting/bolting device (2) by placing the four leg pieces (52)(52')(53)(53) of seat cushion (SC) on the corresponding four elements (24)(24')(23)(23) of the device (2). Then, both cylinders (23A)(23A) are actuated to firmly lock the respective two forward leg pieces (53)(53) via the associated latches (23Ae)(23Ae), whereby the seat cushion is set on a horizontal plane at a predetermined position.

After such preliminary setting procedures, the robot hand device (3) is automatically operated to direct its hand portion (30) towards the thus-positioned seat back (SB) on the setting device (1), lowering both lateral arm portions (30A)(30B) thereof alongside the respective two lateral sides (41)(40) of seat back (SB), and actuate the cylinder (C1) to cause the two securing rods (33) (33) to insert into the respective two headrest stay holes (44A)(44A) of seat back (SB). At the same time, both cylinders (31A)(31A) are actuated to move the corresponding two hand portions (31)(31) towards each other to grasp the seat back (SB) from both lateral sides (41)(40) thereof. Thereafter, the rotary cylinder (32A) is energized to cause the rotary arm (32) to rotate downwardly by 90 degrees to the use position, at which the pressure arm section (32a) of rotary arm (32) works to fold and press the turn-up part (Y) of seat back (SB) onto the right-side lateral wall (40) of same seat back (SB), as shown in FIG. 7. In this way, the turn-up part (Y) is kept folded to fully expose the connecting bracket (46), making it more accessible. Next, the seat back (SB) thus grasped by the arm portion (30) is transferred by the robot hand device (3) towards the setting/bolting device (2) and located at a point right above the backward end portion of seat cushion (SC) in which the connecting bracket (55') and reclining device upper arm (56) are provided, as can be seen in FIG. 8. The seat back (SB) is then lowered towards the seat cushion (SC) and stopped at such a level that the hole (45A) of downwardly projected bracket (45) is coaxially aligned with a threaded hole (See (55'a) in FIG. 1) of connecting bracket (55'), while the two threaded holes (46A)(46A) of connecting bracket (46) are coaxially aligned with the two holes (56A)(56A) of reclining device upper arm (56), respectively, whereupon the seat back (SB) is set at a position ready to be connected to the seat cushion (SC), thus defining one connecting point at the thus-aligned holes (45A)(55'a) and another connecting point at the thus-aligned paired holes (56A, 46A)(56A, 46A).

Both two cylinders (22B)(22B) are simultaneously actuated to cause displacement of their associated bolt screwing devices (22)(22) toward the foregoing two connecting points, respectively. As viewed from FIG. 9, the left-side bolt screwing device (22) is driven by the drive source (22C) to screw a bolt into the aligned holes (45A)(55'a), thereby connecting together the two juxtaposed brackets (45)(55'), whereas on the other hand, the right-side bolt screwing device (22) is driven by the drive source (22C) to screw a bolt into the lower set of aligned holes (56A, 46A). This right-side bolt screwing device (22) is then raised by a cylinder (22D) to screw a bolt into the upper set of aligned holes (56A, 46A), so that the seat back connecting bracket (46) is fixedly connected to the reclining device upper arm (56). Thus, the seat back (SB) is connected to the seat cushion (SC) to produce a connected yet incomplete unit of seat.

Both turn table (20) and hand portion (30) of robot hand device (3) are rotated simultaneously by 180 degrees to orient such incomplete seat unit towards a transfer path (not shown) behind the present system, after which, the cylinders (23A)(23A) are operated to release their latches (23Ae)(23Ae) from the locked relation with the respective two forward leg pieces (53)(53) of seat cushion (SC). Then, the robot hand device (3) is operated to bring the incomplete seat unit to a predetermined point in the transfer path, and move the two disc-like hand portions (31)(31) away from each other to release the seat back (SB) from the grasped state, and also rotate back the rotary arm (32) by 90 degrees to release the turn-up part (Y) of seat back (SB) from the folded and pressed state.

Finally, the worker should stretch the turn-up part (Y) over the reclining device upper arm (56) bolted to the connecting bracket (46) of seat back (SB), then fold the same onto the back side (BF2) of seat back frame (BF), and secure the back board (4F) to the back side (43) of seat back (SB), to thereby obtain such resultant automotive seat as shown in FIG. 10. Designations (57) and (65) denote a garnish cover and an operation lever of the reclining device (RD), respectively.

Accordingly, it is appreciated that, in accordance with the present invention, the seat back (SB) may be automatically transferred in an upright state to a horizontally set seat cushion (SC), while keeping a part of upholstery of seat back (SB) turned up to expose a connecting bracket (46) therefrom, and then a connecting part (56) of seat cushion (SC) be automatically connected, as by bolting, to that exposed connecting bracket (46) of seat back (SB), in unmanned way. Therefore, there are reduced much labor and expertise on the part of workers in this particular process of seat assemblage.

While having described the present invention thus far, it should be understood that the invention is not limited to the illustrated embodiments, but any other modifications, replacements and additions may be structurally applied thereto without departing from the scopes of the appended claims. For example, the turn-up part (Y) of upholstery may be defined at both lateral sides (41)(40) of seat back (SB), in which case, a pair of retaining plates (11) be so arranged on the setting device (1) as to be disposed on the opposite sides of the forward and backward support plates (13)(14) and a pair of rotary arms (32) be provided at the respective two lateral arm portions (30A)(30B) of robot hand device (3).

What is claimed is:

1. A system for automatically connecting a seat back to a seat cushion to assemble a seat, in which the seat back has an upholstery and a first connecting member covered with a part of the upholstery, and the seat cushion has a second connecting member to be connected to said first connecting member, said system comprising:

a first setting means for setting said seat back at a predetermined position in a generally upright state;

said first setting means including a retaining means for receiving and retaining said part of upholstery of said seat back which is peeled or turned up from the same seat back, so as to keep said first connecting member exposed therefrom;

a second setting means for setting said seat cushion at a predetermined position in a generally horizontal state;

said second setting means including an automated connecting means for automatically connecting said first connecting member exposed from said seat back, to said second connecting member of said seat cushion;

a robot hand means for automatically grasping and transferring said seat back set by said first setting means towards said second setting means; and said robot hand means including a pressure arm means for pressingly holding said part of upholstery of said seat back which is turned up on said retaining means of said first setting means, to thereby continue to keep said first connecting member exposed from the seat back.

2. The system as defined in claim 1, wherein said first setting means comprises a pair of upwardly projected first support elements for supporting a central body portion of said seat back therebetween and a pair of upwardly projected second support elements, each being for supporting respective two lateral side portions of said seat back.

3. The system according to claim 2, wherein there is further provided a securing means for securing said seat back at a predetermined position in addition to said upwardly projected first and second support elements, said securing means being operable for connection with said first connecting member of said seat back to thereby secure the same seat back positively against dislocation from the predetermined position.

4. The system as defined in claim 1, wherein said seat cushion is provided, at the reverse side thereof, with plural different leg pieces having different sizes and shapes, creating uneven points there, and wherein said second setting means further includes plural different securing elements, each being arranged to receive and secure a corresponding one of said plural different leg pieces to counterbalance said uneven points such as to set said seat cushion on a generally horizontal plane.

5. The system as defined in claim 1, wherein said second setting means comprises a turn table and a plurality of securing elements provided on said turn table, said plurality of securing elements being for securing thereon said seat cushion in a generally horizontal state.

6. The system as defined in claim 1, wherein said retaining means includes a vertically extending portion and a horizontally extending portion, defining thus a generally right-angled corner portion therebetween, which is to receive and retain said part of upholstery of said seat back.

7. The system as defined in claim 1, wherein said robot hand means further includes a pair of spaced-apart hand portions operable to move toward and away from each other to grasp respective lateral sides of said seat back, and wherein said pressure arm means is disposed adjacent to one of said pair of spaced-part hand portions.

8. The system as defined in claim 1, wherein said pressure arm means of said robot hand means comprises a rotary cylinder and a rotary arm connected to said rotary cylinder, and wherein operation of said rotary cylinder causes said rotary arm to rotate in a direction to pressingly hold said part of upholstery of said seat back which is turned up on said retaining means.

9. The system according to claim 8, wherein said rotary arm is of a generally L-shaped configuration having a pressure section to press and hold said part of upholstery of said seat back which is turned up on said retaining means.

10. The system as defined in claim 1, wherein said robot hand means further includes a securing means for securing and holding said seat back against dislocation, said securing means being operable for insertion into at least one headrest stay hole formed in an upper side of said seat back.

11. The system as defined in claim 1, wherein said automated connecting means comprises an automated bolting device operable to automatically connect said first connecting member of said seat back via a bolt to said second connecting member of said seat cushion.

12. The system as defined in claim 1, wherein said first connecting member of said seat back is a connecting bracket, and wherein said second connecting member of said seat cushion is a connecting arm of a reclining device provided at the same seat cushion.

13. The system as defined in claim 1, wherein a pair of said first connecting members are provided in two respective lateral sides of said seat back and a pair of said second connecting members are provided in two respective lateral sides of said seat cushion, and wherein a pair of said automated connecting means are so arranged symmetrically relative to said second setting means as to automatically connect said pair of second connecting members to said pair of first connecting members, respectively.

14. A system for automatically connecting a seat back to a seat cushion to assemble a seat, in which the seat back has an upholstery and a first connecting member provided in one lateral side thereof, said first connecting member being covered with a part of said upholstery, and the seat cushion has a second connecting member to be connected with said first connecting member, said system comprising:

a first setting means for setting said seat back at a predetermined position in a generally upright state;

said first setting means including a retaining means disposed adjacent to said one lateral side of said seat back, said retaining means being for receiving and retaining a part of an upholstery of said seat back which is peeled or turned up from said one lateral side of the same seat back, so as to keep said first connecting member exposed therefrom;

a second setting means for setting said seat cushion at a predetermined position in a generally horizontal state;

said second setting means including an automated connecting means for automatically connecting said first connecting member exposed from said one lateral side of said seat back, to said second connecting member of said seat cushion;

a robot hand means for automatically grasping and transferring said seat back set by said first setting means towards said second setting means; and said robot hand means including a pressure arm means for pressingly holding said part of upholstery of said seat back which is turned up on said retaining means of said first setting means, to thereby continue to keep said first connecting member exposed from said one lateral side of said seat back.

15. The system as defined in claim 14, wherein said robot hand means further includes a pair of spaced-apart hand portions operable to move toward and away from each other to grasp said one lateral side of said seat back and another lateral side of the same seat back, and wherein said pressure arm means is disposed adjacent to one of said pair of spaced-apart hand portions corresponding to said one lateral side of said seat back.

16. The system as defined in claim 14, wherein another first connecting member is provided in another lateral side of said seat back and a pair of said second connecting members are provided in two respective lateral sides of said seat cushion, and wherein a pair of said automated connecting means are so arranged symmetrically relative to said second setting means as to automatically connect said pair of second connecting members to said one and another first connecting members, respectively.

* * * * *